Patented Feb. 25, 1936

2,032,035

UNITED STATES PATENT OFFICE 2,032,035

PURIFICATION OF TRINITROTOLUENE

Joseph A. Wyler, Allentown, Pa., assignor to Trojan Powder Company, a corporation of New York No Drawing. Application January 26, 1935, Serial No. 3,641

4 Claims. (Cl. 260—142)

My invention relates to the Purification of trinitrotoluene, and more particularly relates to an improved process of treating crude trinitrotoluene to obtain therefrom trinitrotoluene of high purity.

I have discovered that a warm mixture of carbon tetrachloride and dichlorbenzene forms a desirable solvent for crude trinitrotoluene, and that upon cooling this solution, the common impurities present in crude trinitrotoluene tend to remain in solution, while the trinitrotoluene which separates out during the cooling operation is of high purity.

In the preferred practice of my invention, I employ ortho-dichlorbenzene, although I may employ the metadichlorbenzene or the paradichlorbenzene. I prefer to employ from 10 parts to 40 parts of dichlorbenzene, and from 90 parts to 60 parts of carbon terachloride. By heating the solvent mixture preferably to 75° C., and then adding the crude trinitrotoluene with stirring or agitation, I obtain a satisfactory solution of the trinitrotoluene. The mixture is preferably filtered hot, to remove any insoluble or suspended impurities, and is then cooled to a temperature of about 25° C. The trinitrotoluene which then separates is removed by suction filtration or by any other convenient means, and the crystals are dried at a temperature of from 30° C. to 60° C.

A recovery of 90% or more of purified trinitrotoluene, based upon the weight of the crude trinitrotoluene treated can be readily obtained by my process, and purified trinitrotoluene of a light cream color, and having a melting point of 80.2° C. or higher can be readily obtained by my process.

In order to show the significance of my invention, I have found that at a temperature of 55° C. carbon tetrachloride when used alone will dissolve only about 4.5 parts by weight of trinitrotoluene per 100 parts by weight of the carbon tetrachloride solvent used, whereas a mixture of 90 parts by weight of carbon tetrachloride and 10 parts by weight of ortho-dichlorbenzene will dissolve about 13 parts by weight of trinitrotoluene at this same temperature of 55° C., thus showing a solubility more than twice as great, and nearly three times as great, as the solubility or carbon tetrachloride when used alone.

By employing a mixture of 85 parts by weight of carbon tetrachloride and 15 parts by weight of ortho-dichlorbenzene I am able to dissolve 24 parts by weight of trinitrotoluene in 100 parts by weight of the mixed solvent, thus showing that by employing the addition of only 15 parts of ortho-dichlorbenzene I have increased the solubility of the solvent mixture by more than 600% over the solubility of carbon tetrachloride alone at this same temperature of 55° C.

It is significant that upon cooling either of these mixtures of carbon tetrachloride, ortho-dichlorbenzene and dissolved trinitrotoluene to a temperature of 25° C., most of the trinitrotoluene crystallizes out of the solvent, and the cooled solvent does not contain any greater quantity of dissolved trinitrotoluene than is contained by carbon tetrachloride alone at the higher temperature of 55° C. employed in the solution step.

As mixtures of carbon tetrachloride and dichlorbenzene have greater solubility for the impurities present in crude trinitrotoluene than they have for pure trinitrotoluene, it will be evident that instead of employing my solvent mixture of dichlorbenzene and carbon tetrachloride in the recrystallization of trinitrotoluene, I may employ it as a washing liquor with which to treat solid trinitrotoluene particles, preferably present as a fine crystal meal. For example, I may employ a mixture of 5% of dichlorbenzene and 95% of carbon tetrachloride (these percentages being based on the weights of the two materials used) and I may use this solvent mixture to percolate through a thick bed of trinitrotoluene present as a crystal meal or as a mass made up of very fine crystal particles of trinitrotoluene.

I have found that when finely divided solid trinitrotoluene is extracted with a solvent mixture made up of carbon tetrachloride containing dichlorbenzene, there is substantially no solvent action on the pure trinitrotoluene at low temperatures, whereas the impurities present in the crude trinitrotoluene dissolve readily in the solvent mixture even in the cold, and thus are almost completely removed from the crude trinitrotoluene, leaving in the percolator a purified trinitrotoluene which can be readily separated from the excess of the solvent mixture.

Among the advantages of my process of purifying trinitrotoluene is the fact that the ortho-dichlorbenzenes are less volatile than carbon tetrachloride, and like carbon tetrachloride are relatively non-flammable. The dichlorbenzenes are saturated bodies and do not tend to readily enter into side reactions with such nitrogen oxides as are commonly present in crude trinitrotoluene.

Although I prefer to employ a mixture of ortho-dichlorbenzene and carbon tetrachloride in the practice of my invention, I have discovered that the solvent relationships are not confined to ortho-dichlorbenzene alone, but are common to the dichlorbenzenes, and I may use metadichlorbenzene or paradichlorbenzene in the practice of my invention, as the equivalent of ortho-dichlorbenzene. As paradichlorbenzene is a solid body at ordinary conditions of temperature, the use of this material involves additional precaution in removing the last traces of the material from the purified trinitrotoluene, and when employing paradichlorbenzene in the practice of my invention, I find it desirable to make a final wash, or preferably a final crystallization, from pure carbon tetrachloride. The carbon tetrachloride left after this purification step is conveniently used in the making up of fresh batches of the solvent mixture of carbon tetrachloride and the dichlorbenzene.

All of the dichlorbenzenes are sufficiently volatile with steam to enable the recovery of the solvent to be readily carried out.

It will be evident that many changes may be made in the practice of my invention without departing from the principles of the invention as herein disclosed, and accordingly no limitation should be made upon my invention except as indicated in the appended claims.

I claim:

1. In the preparation of purified trinitrotoluene, the process which comprises treating crude trinitrotoluene with a solvent mixture consisting essentially of dichlorbenzene and carbon tetrachloride.

2. In the preparation of purified trinitrotoluene, the process which comprises treating crude trinitrotoluene with a solvent mixture consisting essentially of ortho-dichlorbenzene and carbon tetrachloride.

3. The process of purifying trinitrotoluene which comprises recrystallizing trinitrotoluene from a solvent consisting predominately of a mixture of carbon tetrachloride and a dichlorbenzene.

4. The process of purifying trinitrotoluene which comprises recrystallizing trinitrotoluene from a solvent consisting predominately of a mixture of carbon tetrachloride and ortho-dichlorbenzene.

JOSEPH A. WYLER.